United States Patent
Park et al.

(10) Patent No.: US 9,304,387 B2
(45) Date of Patent: Apr. 5, 2016

(54) DEVICE FOR DIRECTIONAL LIGHT FIELD 3D DISPLAY AND METHOD THEREOF

(75) Inventors: Ju Yong Park, Seoul (KR); Dong Kyung Nam, Yongin-si (KR); Du-Sik Park, Suwon-si (KR); Gee Young Sung, Daegu-si (KR); Yun-Tae Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 990 days.

(21) Appl. No.: 12/382,820

(22) Filed: Mar. 24, 2009

(65) Prior Publication Data

US 2010/0118126 A1 May 13, 2010

(30) Foreign Application Priority Data

Nov. 13, 2008 (KR) .................. 10-2008-0112806

(51) Int. Cl.
*H04N 13/04* (2006.01)
*G03B 35/00* (2006.01)
*G02B 27/22* (2006.01)

(52) U.S. Cl.
CPC ............ *G03B 35/00* (2013.01); *G02B 27/2285* (2013.01); *H04N 13/0427* (2013.01); *H04N 13/0445* (2013.01); *H04N 13/0459* (2013.01)

(58) Field of Classification Search
CPC ...... G02B 27/2285; G02B 27/22; G02B 5/32; G03B 35/00; G03B 21/28; H04N 13/0459; H04N 13/0445; H04N 13/0427; H04N 13/04

USPC .................... 348/42–44, 51–60; 359/1–35
See application file for complete search history.

(56) References Cited

U.S. PATENT DOCUMENTS

| | | | |
|---|---|---|---|
| 6,208,318 B1 * | 3/2001 | Anderson et al. | 345/1.1 |
| 2007/0103549 A1 * | 5/2007 | Lee | 348/148 |
| 2007/0242237 A1 * | 10/2007 | Thomas | 353/94 |

FOREIGN PATENT DOCUMENTS

| | | |
|---|---|---|
| JP | 2004-012477 | 1/2004 |
| JP | 2005-221690 | 8/2005 |
| JP | 2006-085235 | 3/2006 |
| JP | 2006-098971 | 4/2006 |
| JP | 3787841 | 4/2006 |
| JP | 3927509 | 3/2007 |
| JP | 3927578 | 3/2007 |
| JP | 2007-102068 | 4/2007 |
| JP | 3955589 | 5/2007 |
| JP | 2008-096721 | 4/2008 |

OTHER PUBLICATIONS

Korean Office Action issued Sep. 1, 2014 in Korean Patent Application No. 10-2008-0112806.

* cited by examiner

*Primary Examiner* — Cheikh Ndiaye
(74) *Attorney, Agent, or Firm* — NSIP Law

(57) ABSTRACT

A three-dimensional (3D) display device and method using a directional light field is provided. The 3D display device may construct a light field using a direction light generated by a high speed projector and at least one rotating optical device to thereby display a more natural 3D image in a wide region.

21 Claims, 10 Drawing Sheets

DEVICE FOR DIRECTIONAL LIGHT FIELD 3D DISPLAY AND METHOD THEREOF

CROSS-REFERENCE TO RELATED APPLICATION

This application claims the benefit of Korean Patent Application No. 10-2008-0112806, filed on Nov. 13, 2008, in the Korean Intellectual Property Office, the disclosure of which is incorporated herein by reference.

BACKGROUND

1. Field

One or more exemplary embodiments relate to a three-dimensional (3D) display device and method using a directional light field, and more particularly, to a technology that may display a 3D image in a relatively wider range using a high speed projector, a rotating optical device, and a holographic screen or a holographic mirror.

2. Description of the Related Art

Generally, a three-dimensional (3D) display device using a direction light may use a Flat Panel Display (FPD) and a lenticular array, or may use a holographic screen and a plurality of projectors.

In the case of using the lenticular array and the FPD, a resolution of a single direction may decrease by 1/number of directions. In the case of using the plurality of projectors, costs may increase in association with an increase in the projectors. Also, a color, a location, and relative positions between the plurality of projectors may not be easily corrected.

A display device capable of playing an image may divide the image by a time to thereby express the image. The display device with a high speed projector and a holographic diffuser mounted rotating mirror may be constructed to embody a directional ray when light is reflected from a surface of the mirror. In this case, a display region may be limited to a swept volume of the mirror.

Accordingly, there is a need for a 3D display structure that may display a 3D image in a relatively wider region, without causing a deterioration of a resolution in each direction.

SUMMARY

According to an exemplary embodiment, there may be provided a three-dimensional (3D) display device including: an optical system including a high speed projector, a rotating mirror, a rotating lens, and a reflecting mirror; a display unit to be provided in an upper portion or a lower portion of the optical system; and an operation control unit to control an operation of the optical system.

In another exemplary embodiment, the optical system may have a cylindrical shape, and the reflecting mirror includes a cylindrical reflecting mirror to form a side surface of the optical system, wherein the high speed projector is provided on a center of a bottom of the optical system, the rotating mirror is provided above the high speed projector, and the rotating lens is disposed between the high speed projector and the cylindrical reflecting mirror.

Also, in the optical system, a light emitted from the high speed projector may be reflected at the rotating mirror. The reflected light may pass through the rotating lens to be reflected at the reflecting mirror and then be projected towards the display unit.

Also, the display unit has a cylindrical shape, and a side surface of the display unit includes a holographic screen.

Also, the operation control unit may include: an image generation unit to generate a directional light field image using an input image, a resolution of a light direction, and a frame rate of the 3D display device; a synchronization signal generation unit to generate a synchronization signal to synchronize an image output of the high speed projector with a rotation speed of the optical system; a projector control unit to control the high speed projector using the directional light field image and the synchronization signal; and a rotation speed control unit to control the rotation speed of the optical system using the synchronization signal.

In another aspect of one or more exemplary embodiments, the optical system may have a cylindrical shape, and includes: a cylindrical reflecting mirror to form a side surface of the optical system, the high speed projector being provided on a center of a bottom of the cylindrical shape; first and second ones of the rotating mirrors being provided above the high speed projector; and first and second ones of the rotating lenses being disposed between the high speed projector and the side surface of the optical system at symmetrical locations with respect to a central axis of the optical system, respectively. Also, the display unit may have a semi-cylindrical shape, and a side surface of the display unit may include a holographic screen.

Also, the optical system may output an image based on a 180-degree rotation cycle, using the first and second rotating mirrors and the first and second rotating lenses, also the first and second rotating mirrors and the first and second rotating lenses may rotate based on the central axis of the optical system.

In still another aspect of one or more exemplary embodiments, the optical system may have a cylindrical shape, and includes: the high speed projector being provided on a center of a bottom of the optical system; first, second and third ones of the rotating mirrors provided above the high speed projector; and first, second and third ones of the rotating lenses disposed between the high speed projector and a side surface of the optical system, and spaced apart from each other at a same angle relative to a central axis of the optical system, and the display unit has a trisected cylindrical shape, and a side surface of the display unit includes a holographic mirror.

According to another exemplary embodiment, there may be provided a 3D display method including: generating a directional light field image from an input image; generating a synchronization signal for synchronizing an image output of a high speed projector with a rotation speed of a rotating system including a rotating mirror and a rotating lens; outputting the directional light field image from the high speed projector using the synchronization signal, and controlling the rotation speed of the rotating and rotating lens; and projecting the output directional light field image towards a screen or a mirror.

Additional aspects of the exemplary embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of the exemplary embodiments, taken in conjunction with the accompanying drawings of which.

DETAILED DESCRIPTION

Figure 1:
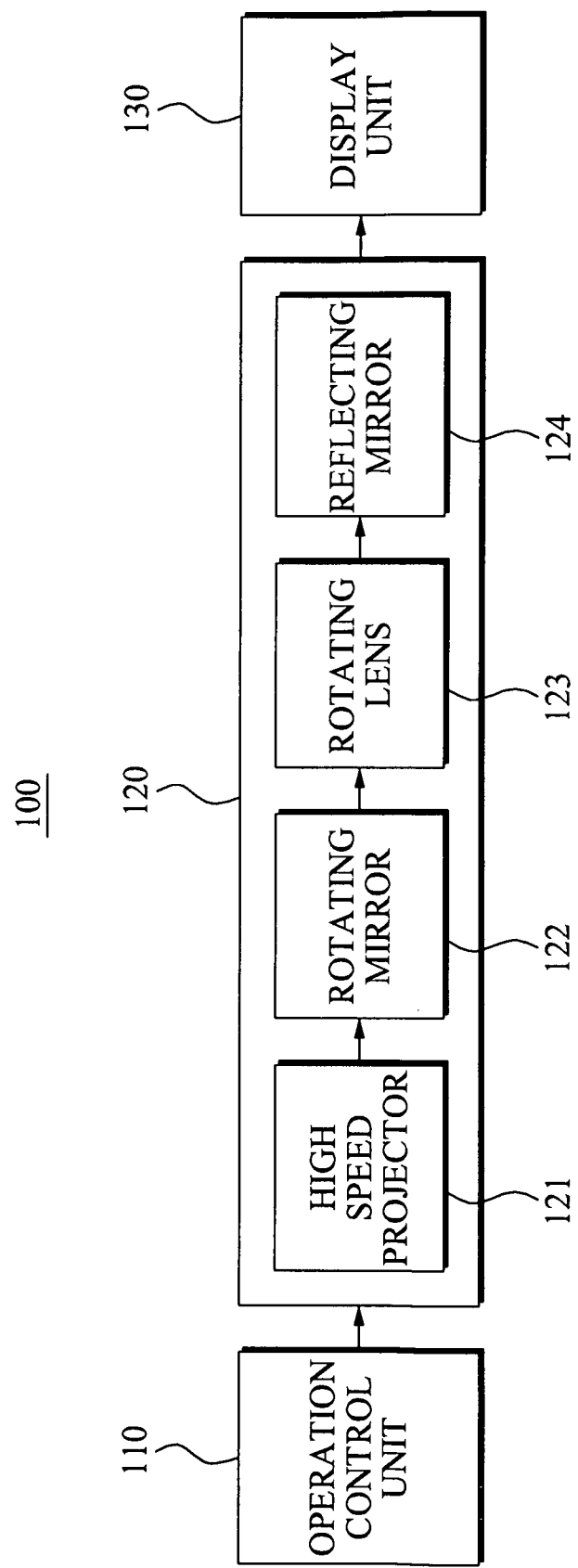
FIG. 1 is a block diagram illustrating a three-dimensional (3D) display device according to an exemplary embodiment.

Reference will now be made in detail to the embodiments, examples of which are illustrated in the accompanying drawings, wherein like reference numerals refer to the like elements throughout. The exemplary embodiments are described below to explain the present disclosure by referring to the figures.

FIG. 1 is a block diagram illustrating a three-dimensional (3D) display device 100 according to an exemplary embodiment.

Referring to FIG. 1, the 3D display device 100 may, but not necessarily, include an operation control unit 110, an optical system 120, and a display unit 130.

The optical system 120 may, but not necessarily, include at least one of a high speed projector 121, a rotating mirror 122, a rotating lens 123, and a reflecting mirror 124.

The optical system 120 may, but not necessarily, be provided in a cylindrical form. The high speed projector 120 may, but not necessarily, be provided on a center of a bottom of the optical system 120. In addition to the center of the bottom, the high speed projector 120 may instead be provided in any appropriate space inside or outside the optical system 120.

The rotating mirror 122 may be provided above the high speed projector 121. When the high speed projector 121 is provided on the center of the bottom of the optical system 120, a light emitted from the high speed projector 121 may be reflected at the rotating mirror 122 to enter the rotating lens 123. In this instance, a location of the rotating mirror 122 may be determined in correspondence with a location of the high speed projector 121. When the high speed projector 121 is provided on the center of the top of the optical system 120, the rotating mirror 122 may be provided below the high speed projector 121.

The rotating lens 123 may be disposed between the high speed projector 121 and the reflecting mirror 124 to invert the light reflected by the rotating mirror 122 and thereby transmit the light to the cylindrical reflecting mirror 124. Here, a location of the rotating mirror 122 and a location of the rotating lens 123 may be relatively determined, whereby the rotating mirror 122 and the rotating lens 123 may rotate about a central axis of the optical system 120.

The reflecting mirror 124 may, but not necessarily, be cylindrical, and may form a side surface of the optical system 120 as a mirror. Here, the reflecting mirror 124 may reflect the light coming from the rotating lens 123 to thereby transmit the reflected light to the display unit 130. The reflecting mirror 124 may be provided in a truncated conic form, instead of the cylindrical form.

The display unit 130 may be provided in a cylindrical form, and may, but not necessarily, form a side surface of the display unit 130 as a holographic screen or a holographic mirror. Accordingly, the light reflected from the reflecting mirror 124 may be displayed via the holographic screen. The light projected towards the holographic screen may have a very small horizontal scattering angle and a very large vertical angle and thus may embody a horizontal parallax.

When the display unit 130 is formed of the holographic mirror, the reflecting mirror 124 may not be used.

Here, the holographic screen or the holographic mirror may be provided in another form excluding the cylindrical form or the partially cylindrical form. However, when the holographic screen or the holographic mirror is provided in the cylindrical form or the partially cylindrical form, it is possible to embody a directional light having a uniform resolution.

The operation control unit 110 may control an operation of the optical system 120. Hereinafter, the operation control unit 110 may be further described in detail with reference to FIG. 2.

Figure 2:
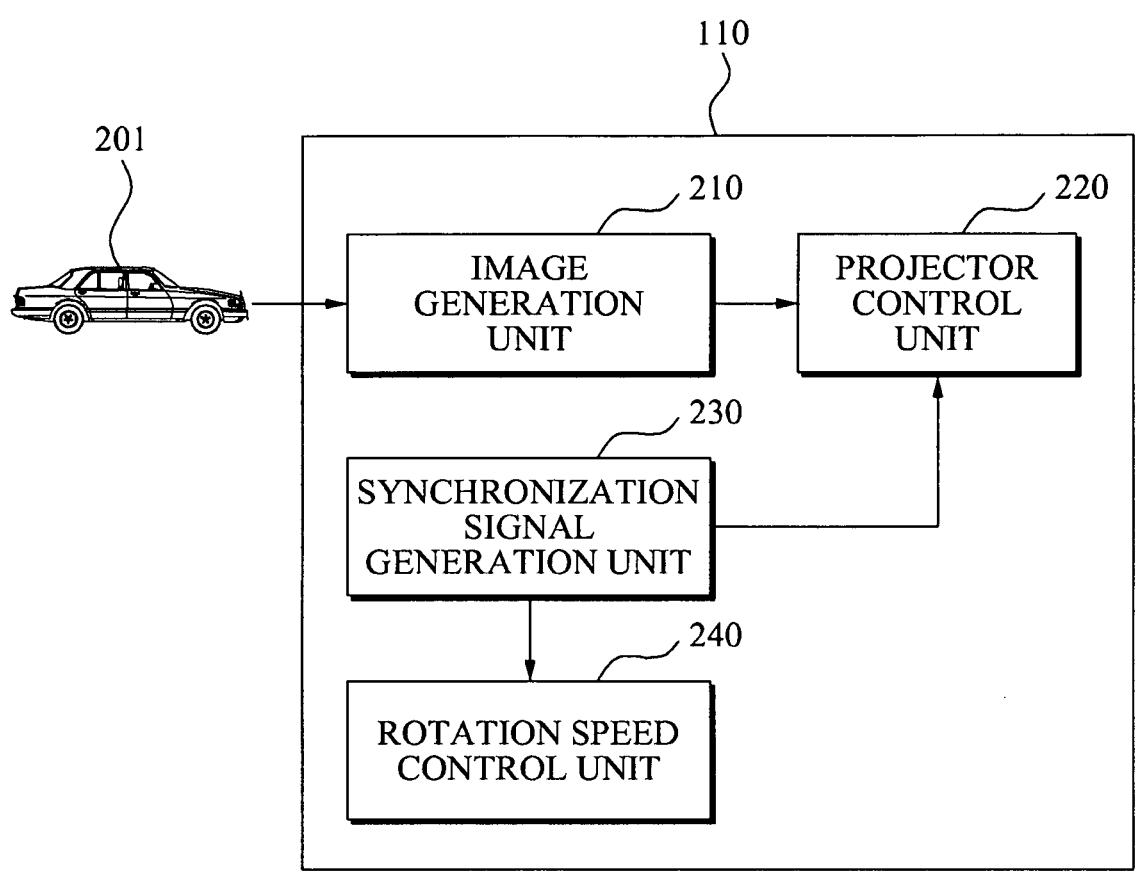
FIG. 2 is a block diagram illustrating a configuration of an operation control unit included in the 3D display device of FIG. 1.

Referring to FIG. 2, the operation control unit 110 may include an image generation unit 210, a synchronization signal generation unit 220, a projector control unit 230, and a rotation speed control unit 240.

FIG. 2 is a block diagram illustrating a configuration of the operation control unit 110 included in the 3D display device 100 of FIG. 1.

The image generation unit 210 may generate a directional light field image using an input image 201, a resolution of a light direction, and a frame rate of the 3D display device 100. Here, the resolution of the light direction may be defined as an angle between a plurality of light directions.

The synchronization signal generation unit 220 may generate a synchronization signal synchronizing an image output of the high speed projector 121 with a rotation speed of the rotating mirror 122 and the rotating lens 123. Here, the synchronization signal may be generated based on information associated with the frame rate of the 3D display device 100.

The projector control unit 230 may, but not necessarily, control the high speed projector 121 using the directional light field image and the synchronization signal.

The rotation speed control unit 240 may control the rotation speed of the rotating mirror 122 and the rotating lens 123 using the synchronization signal.

As described above, according to an exemplary embodiment, a 3D image may be displayed on a relatively wider region without deteriorating a resolution, using a new structure of 3D display device, enabling a plurality of users to simultaneously view the 3D image.

Figure 3:
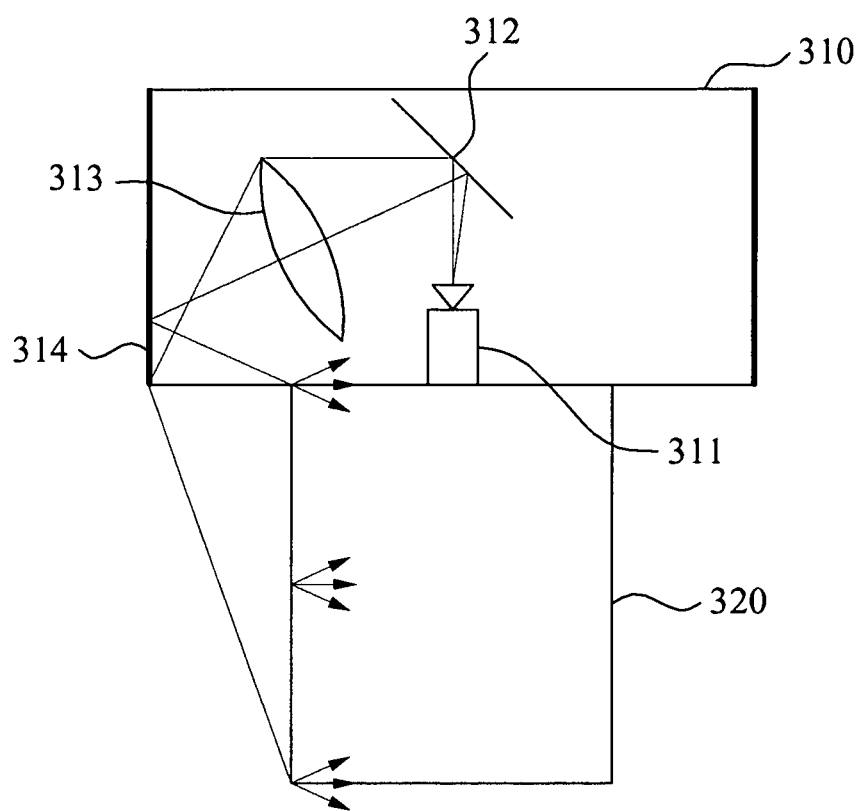
FIG. 3 is a cross-sectional view of a 3D display device capable of omni-directional viewing in an exclusive space according to an exemplary embodiment.

FIG. 3 is a cross-sectional view of an omnidirectional 3D display device viewing in an exclusive space according to an exemplary embodiment.

Referring to FIG. 3, the 3D display device may include an optical system 310, a holographic screen 320, and an operation control unit (not shown).

The optical system 310 may, but not necessarily, be provided in a cylindrical form. A high speed projector 311 may be provided on a center of a bottom of the optical system 310. A light emitted from the high speed projector 311 may be reflected at a cylindrical reflecting mirror 314 via a rotating mirror 312 and a rotating lens 313 and then be projected towards the holographic screen 320. Accordingly, in FIG. 3, since the holographic screen 320 is provided below the optical system 310, a viewing region may be formed below the optical system 310.

Here, a location of the rotating mirror 312 and a location of the rotating lens 313 may be relatively determined, whereby the rotating mirror 312 and the rotating lens 313 may be spaced apart from each other to thereby rotate together.

Conversely, when the optical system 310 is provided below the holographic screen 320, the view region may be formed above the optical system 310.

Figure 4:
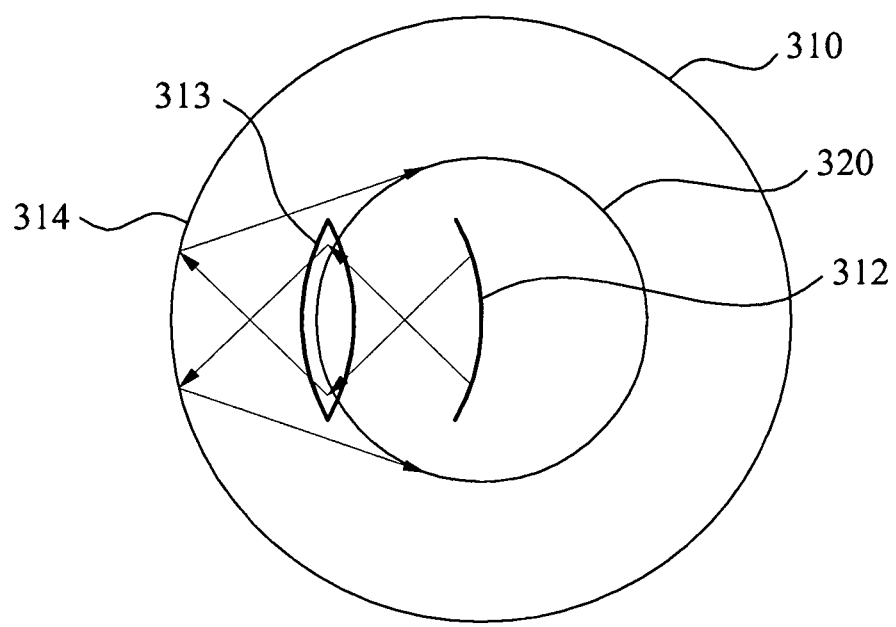
FIG. 4 is a plan view of the 3D display device of FIG. 3.

FIG. 4 is a plan view of the 3D display device of FIG. 3.

Referring to FIG. 4, a light emitted from the high speed projector 311 shown in FIG. 3 may be collected at the rotating mirror 312. The collected light may be reversed via the rotating lens 313 and be transmitted to the cylindrical reflecting mirror 314. The reflecting mirror 314 may reflect, towards the holographic screen 320, the light at a mirror surface corresponding to a cylindrical side surface thereof.

The high speed projector 311 may play a plurality of frames with respect to a single rotation of the optical system 310, and transmit different images to the holographic screen 320 at different locations, respectively. Therefore, it is possible to embody a multi-directional light on a single point of a horizontal plane.

Figure 5:
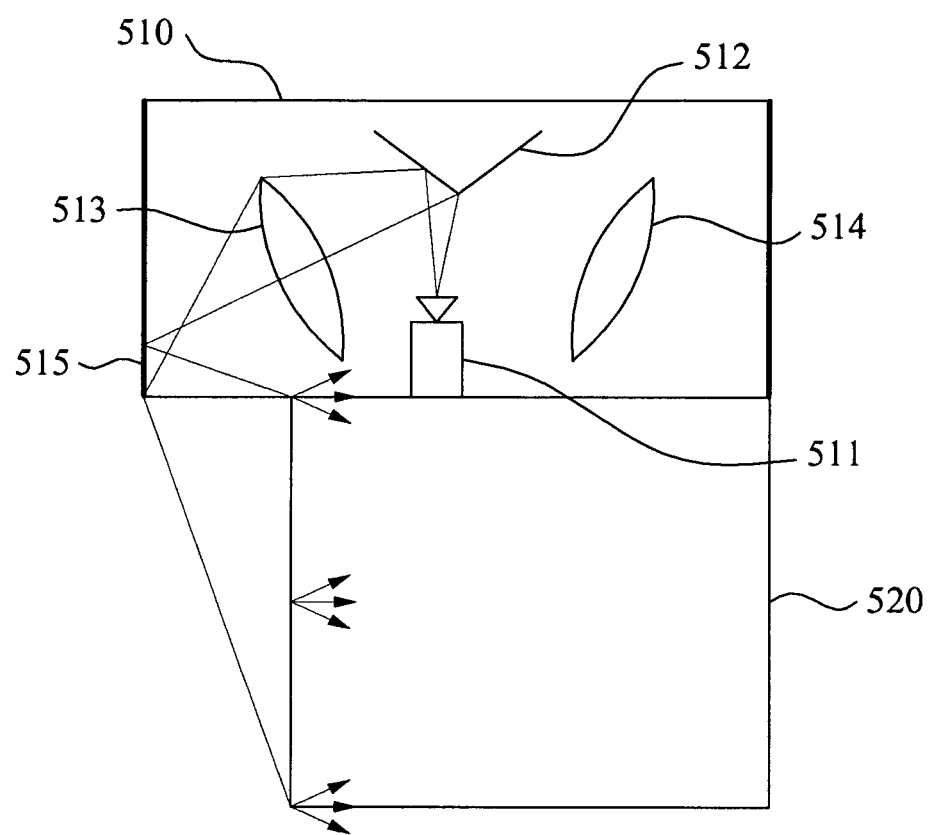
FIG. 5 is a cross-sectional view of a 3D display device to enable a plurality of users to view a 3D image using a semi-cylindrical holographic screen according to another exemplary embodiment.

FIG. 5 is a cross-sectional view of a 3D display device to enable a plurality of users to view a 3D image using a semi-cylindrical holographic screen according to another exemplary embodiment.

Referring to FIG. 5, the 3D display device may include an optical system 510, a holographic screen 520, and an operational control unit (not shown).

The optical system 510 may, but not necessarily, be cylindrical. The optical system 510 may include a high speed projector 511 that is provided on a center of a bottom of the optical system 510, two rotating mirrors 512, two rotating lenses 513 and 514, and a cylindrical reflecting mirror 515. Through the above configuration, the optical system 510 may output an image based on a 180-degree rotation cycle.

Accordingly, in FIG. 5, since the optical system 510 may, but not necessarily, output the image on a screen twice with a single rotation of the optical system 510, it is possible to enhance a frame rate twofold compared with a case where a single rotating mirror and a single rotating lens are provided. In this case, when the rotation speed of the optical system 510 decreases by one half, it is possible to enhance a resolution of a light direction to be as much as two folds at the same frame rate of the high speed projector 511. The reflecting mirror 515 may be provided in a form of a truncated conic form, instead of the cylindrical form.

Also, the optical system 510 may be provided below the holographic screen 520.

Figure 6:
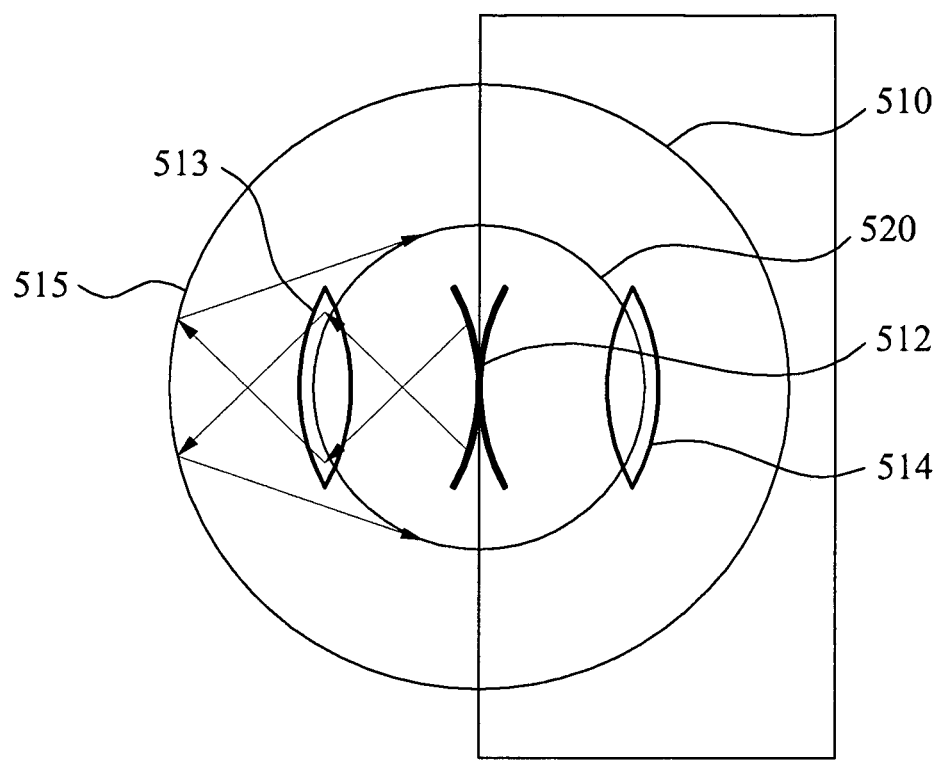
FIG. 6 is a plan view of the 3D display device of FIG. 5.

FIG. 6 is a plan view of the 3D display device of FIG. 5.

Referring to FIG. 6, a light emitted from the high speed projector 511 shown in FIG. 5 may be collected at the rotating mirrors 512. The collected light may be reversed via the rotating lenses 513 and 514, and be transmitted to the cylindrical reflecting mirror 515. The reflecting mirror 515 may reflect, towards the semi-cylindrical holographic screen 520, the light at a mirror surface corresponding to a cylindrical side surface thereof. It is possible to output the image on the screen twice with a single rotation of the optical system 510.

Figure 7:
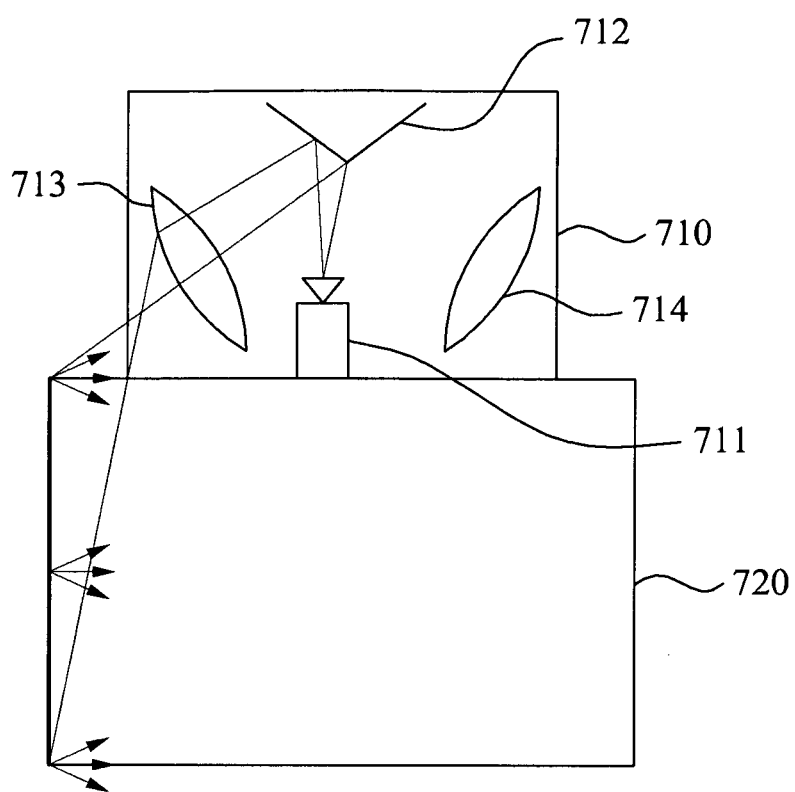
FIG. 7 is a cross-sectional view of a 3D display device to enable a plurality of users to view a 3D image using a trisected cylindrical holographic mirror according to still another exemplary embodiment.

FIG. 7 is a cross-sectional view of a 3D display device to enable a plurality of users to view a 3D image using a trisected cylindrical holographic mirror according to still another embodiment.

Referring to FIG. 7, the 3D display device may include an optical system 710, a holographic screen 720, and an operation control unit (not shown).

The optical system 710 may, but not necessarily, be cylindrical. The optical system 710 may include a high speed projector 711 that is provided on a center of a bottom of the optical system 710, three rotating mirrors 712, and three rotating lenses 713, 714, and 715 (see FIG. 8). Through the above configuration, the optical system 710 may output an image based on a 120-degree rotation cycle. Here, the 3D display device may directly display an image on the cylindrical holographic mirror 720 without using a cylindrical reflecting mirror (not shown).

Accordingly, in FIG. 7, since the optical system 710 may output the image on the screen three times with a single rotation of the optical system 710, it is possible to enhance a frame rate or a resolution of a light direction greater by three times as compared with a case where a single rotating mirror and a single rotating lens are provided. As described above, the reflecting mirror may be provided in a truncated conic form, instead of the cylindrical form.

Also, the optical system 710 may be provided below the holographic screen 720.

Figure 8:
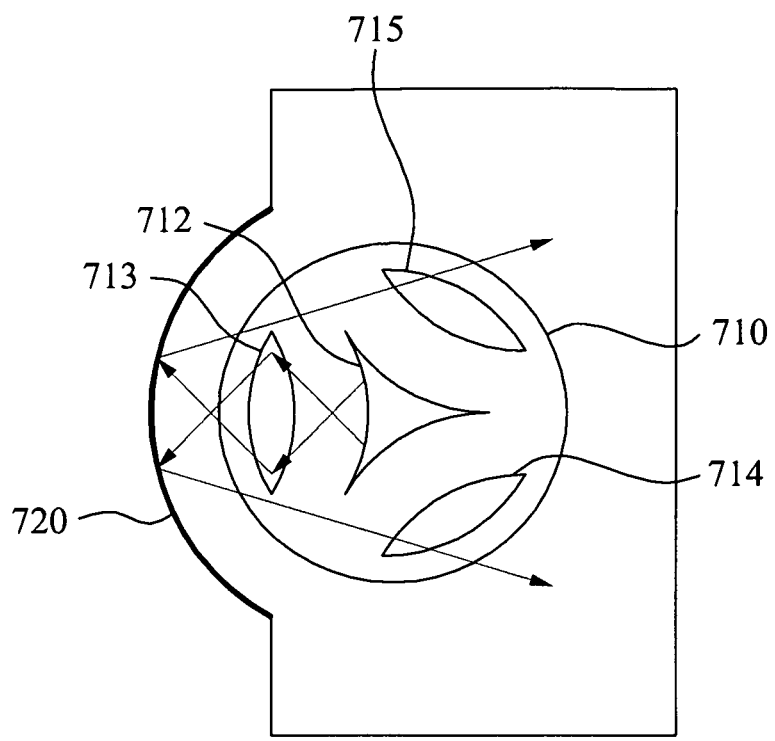
FIG. 8 is a plan view of the 3D display device of FIG. 7.

FIG. 8 is a plan view of the 3D display device of FIG. 7.

Referring to FIG. 8, a light emitted from the high speed projector 711 shown in FIG. 7 may be collected at the rotating mirrors 712. The collected light may be reversed via the rotating lenses 713, 714, and 715, and be transmitted to the cylindrical holographic mirror 720. When embodying a screen using a holographic mirror, it is possible to enhance the brightness.

However, when the mirror is partially cylindrical, a recursive reflection may internally occur. In order to avoid the recursive reflection, as a central angle of the partially cylindrical mirror increases, an angle of incidence of the light from the high speed projector 711 with respect to the mirror surface may need to decrease with respect to a normal of the mirror surface. Hereinafter, a region that is covered by a light reflected from a holographic mirror will be further described in detail.

Figure 9:
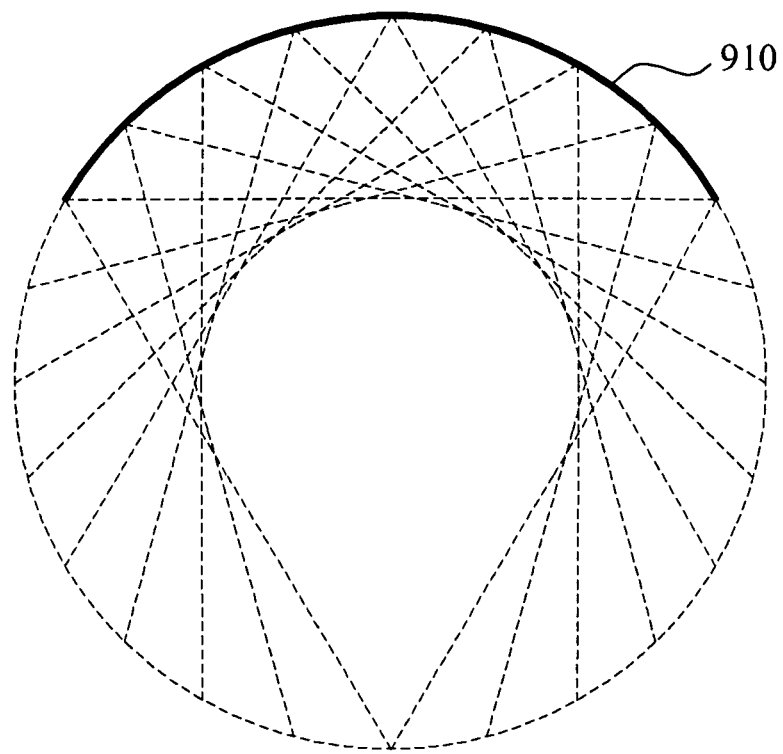
FIG. 9 illustrates a region that is covered by a light reflected at a holographic mirror in a 3D display device according to an exemplary embodiment.

FIG. 9 illustrates a region that is covered by a light reflected from a holographic mirror in a 3D display device according to an exemplary embodiment.

Referring to FIG. 9, when a display unit 910 of the 3D display device is provided in a semi-cylindrical form, an incidence angle with respect to a mirror surface may need to be zero degrees with respect to a normal of the mirror surface in order to avoid a recursive reflection.

However, when the incidence angle is relatively small with respect to the normal of the mirror surface, a region capable of reproducing a multi-directional light may become narrow. When the display unit 910 is provided in the semi-cylindrical form and the incidence angle is zero degrees with respect to the normal of the mirror surface, only points positioned on a center of the semi-cylindrical display unit 910 may reproduce the multi-directional light.

Accordingly, when the display unit 910 is provided in a trisected cylindrical form and the incidence angle is less than or equal to 30 degrees with respect to the normal of the mirror surface, it is possible to prevent the recursive reflection from occurring on the mirror surface. A region that may be capable of reproducing the multi-directional light is shown in FIG. 9. In FIG. 9, where many sectors, indicated by dotted lines, overlap, it may indicate a region where a large amount of multi-directional light may pass. When viewing the image in this region, a user may view an increasing number of multi-directional parallaxes. Also, when a 3D object is positioned in this region, the 3D object may be viewed in a greater variety of directions.

Figure 10:
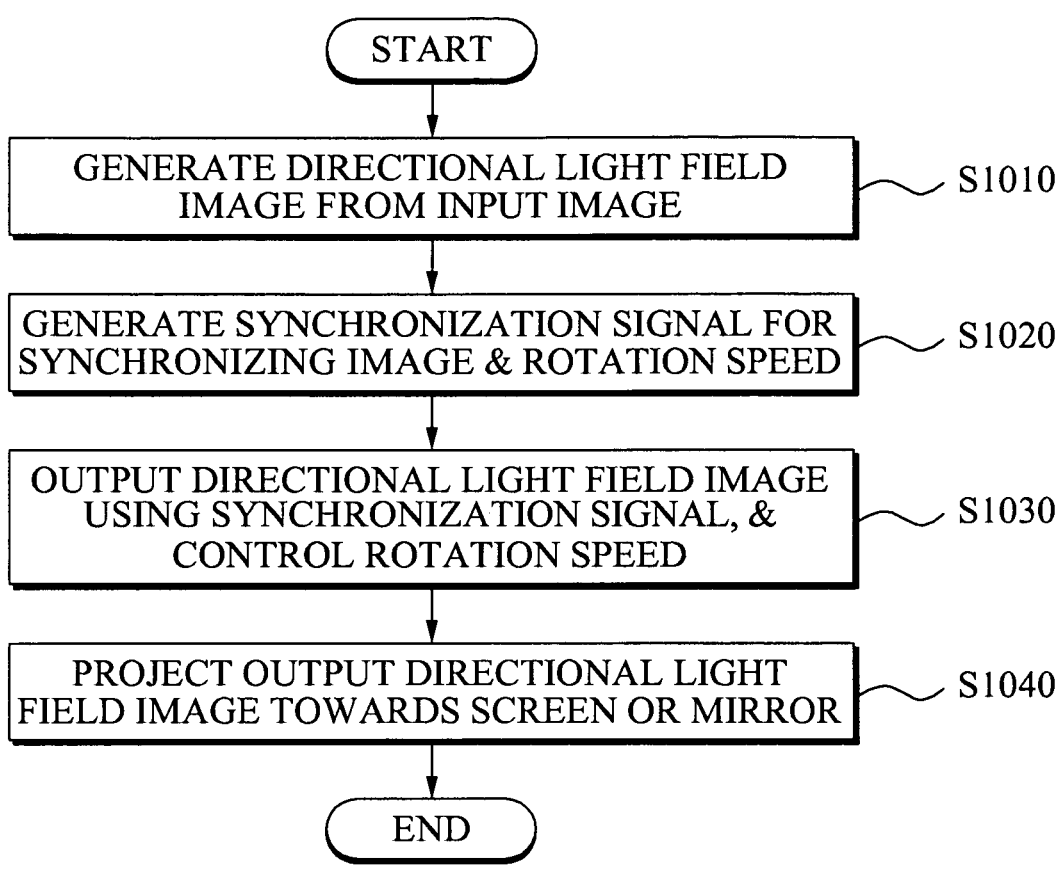
FIG. 10 is a flowchart illustrating a 3D display method according to an exemplary embodiment.

FIG. 10 is a flowchart illustrating a 3D display method according to an exemplary embodiment.

Referring to FIG. 10, in operation S1010, the method may generate a directional light field image from an input image. Here, operation S1010 may include determining a type of the input image, and generating the directional light field image in correspondence with the determined type of the input image.

The type of the input image may be any one of a two-dimensional (2D) image, another 2D image containing depth information, a multi-view image, and a light field image. The directional light field image may be generated in correspondence with various types of the input image.

Also, when generating the light field image, the directional light field image may be generated using the input image, a resolution of a light direction, and a frame rate of a 3D display device.

In operation S1020, the method may generate a synchronization signal for synchronizing an image output of a high speed projector with a rotation speed of a rotating system including at least one of a rotating mirror and a rotating lens. Here, the synchronization signal may be generated based on the frame rate of the 3D display device.

In operation S1030, the method may output the directional light field image from the high speed projector using the synchronization signal, and control the rotation speed of the rotating system including at least one of a rotating mirror and a rotating lens.

In operation S1040, the method may project the output directional light field image towards a screen or a mirror. Operation S1040 may include reflecting, at the at least one rotating mirror, an image that is output from the high speed projector, and refracting, at the at least one rotating lens, the image that is reflected at the at least one rotating mirror.

According to an exemplary embodiment, operation S1040 may, but not necessarily, further include reflecting, at a reflecting mirror, the image that is refracted at the rotating lens. When using a holographic screen at a final end of displaying a 3D image, the reflecting mirror may be used in an optical system. Also, when using a holographic mirror at the final end of displaying the 3D image, the reflecting mirror may not be used in the optical system.

As described above, according to an exemplary embodiment, it is possible to display a 3D image in a relatively wider region by using at least one of a rotating mirror, a rotating lens, and a reflecting mirror, and a holographic screen or a holographic mirror. Here, the reflecting mirror and the holographic screen or the holographic mirror may, but not necessarily, be provided in a cylindrical form, and the like.

Also, according to an exemplary embodiment, there may be provided a glasses-free 3D display device and method that may support a natural motion parallax and reduce a visual fatigue.

The 3D display method according to the above-described example embodiments may be recorded as computer-readable code/instructions in/on a computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa.

Although a few exemplary embodiments have been shown and described, the present disclosure is not limited to the described example embodiments. Instead, it would be appreciated by those skilled in the art that changes may be made in these embodiments without departing from the principles and spirit of the disclosure, the scope of which is defined by the claims and their equivalents.

What is claimed is:

1. A three-dimensional (3D) display device, comprising:
an optical system, including a high speed projector, configured to project light forming an image, in a predetermined direction;
a rotating mirror, with axial rotation about a central axis in line with the predetermined direction, configured to reflect the light forming an image;
a rotating lens, with radial rotation about the central axis, configured to invert the reflected light forming an image;
a display unit provided in an upper portion or a lower portion of the optical system, wherein a side surface of the display unit includes a holographic screen; and
a reflecting mirror, shaped around the first mirror and the lens, and configured to reflect the light forming an image, towards the holographic screen, wherein the reflected light is displayed via the holographic screen; and
an operation control unit configured to control an operation of the optical system, wherein the projected light embodies a horizontal parallax by having a vertical scattering angle larger than a horizontal scattering angle.

2. The 3D display device of claim 1,
wherein the optical system has a cylindrical shape, and the reflecting mirror includes a cylindrical mirror configured to form a side surface of the optical system,
wherein the high speed projector is provided on a center of a bottom of the optical system,
wherein the rotating mirror is disposed above the high speed projector, and
wherein the rotating lens is disposed between the high speed projector and the cylindrical mirror.

3. The 3D display device of claim 1,
wherein, the rotating mirror is configured to reflect, through the rotating lens, a light emitted from the high speed projector, and
wherein the rotating lens is configured to project the reflected light towards the display unit.

4. The 3D display device of claim 1, wherein the operation control unit comprises:
an image generation unit configured to generate a directional light field image, by using an input image, a resolution of a light direction, and a frame rate of the 3D display device;
a synchronization signal generation unit configured to generate a synchronization signal configured to synchronize an image output of the high speed projector with a rotation speed of the optical system;

a projector control unit configured to control the high speed projector, by using the directional light field image and the synchronization signal; and a rotation speed control unit configured to control the rotation speed of the optical system, by using the synchronization signal.

5. The 3D display device of claim 4, wherein:
the types of the input image include a two-dimensional (2D) image, a 2D image containing depth information, a multi-view image, or a light field image, and
the image generation unit is configured to generate the directional light field image according to the type of the input image.

6. The 3D display device of claim 1, wherein the optical system has a cylindrical shape, and comprises:
a cylindrical mirror configured to form a side surface of the optical system, wherein the high speed projector is disposed on a center of a bottom of the cylindrical shape;
first and second rotating mirrors disposed above the high speed projector; and
first and second rotating lenses disposed between the high speed projector and the side surface of the optical system, at symmetrical locations with respect to a central axis of the optical system, respectively;
wherein a side surface of the display unit includes a holographic screen.

7. The 3D display device of claim 6,
wherein the optical system is configured to output an image based on a 180-degree rotation cycle, by using the first and second rotating mirrors and the first and second rotating lenses, and
wherein the first and second rotating mirrors and the first and second rotating lenses are configured to rotate based on the central axis of the optical system.

8. The 3D display device of claim 1, wherein the optical system has a cylindrical shape, and comprises:
the high speed projector disposed on a center of a bottom of the optical system;
first, second and third rotating mirrors disposed above the high speed projector; and
first, second and third rotating lenses disposed between the high speed projector and a side surface of the optical system, and spaced apart from each other at a same angle relative to a central axis of the optical system;
wherein the display unit has a trisected cylindrical shape, and a side surface of the display unit includes a holographic mirror.

9. The 3D display device of claim 8,
wherein the optical system is configured to output an image based on a 120-degree rotation cycle, using the first, second and third rotating mirrors and the first, second and third rotating lenses, and
wherein the first, second and third rotating mirrors and the first, second and third rotating lenses are configured to rotate based on the central axis of the optical system.

10. The 3D display device of claim 8, wherein the first, second and third rotating mirrors are configured to reflect a light emitted from the high projector, respectively through the first, second and third rotating lenses, and towards the holographic mirror.

11. The 3D display device of claim 1, wherein the projector is configured to project images towards different areas of the display unit, as the rotating mirror and the rotating lens rotate.

12. The 3D display device of claim 11, wherein a point, on an overlapped area of the images projected toward the different areas, embodies a multi-direction light.

13. The 3D display device of claim 1, wherein the high speed projector is configured to transmit different images to the display unit at different locations.

14. The 3D display device of claim 13, wherein the different images at the different locations embody a multi-direction light, on a point of a horizontal plane on the display unit.

15. A 3D display method comprising: generating a directional light field image from an input image; generating a synchronization signal configured to synchronize an image output of a high speed projector with a rotation speed of a rotating system, the rotating system including a rotating mirror with axial rotation about a central axis in line with a predetermined direction, and including a rotating lens with radial rotation about the central axis;
outputting the directional light field image from the high speed projector in the predetermined direction, by using the synchronization signal, and controlling the rotation speed of the rotating; and
projecting the output directional light field image towards a holographic mirror shaped around the rotating mirror and the rotating lens, the holographic mirror configured to reflect the inverted light forming an image onto the holographic screen; and
displaying the output directional light field image via the holographic screen, wherein a light, forming the projected output directional light field image, embodies a horizontal parallax by having a vertical scattering angle larger than a horizontal scattering angle.

16. The method of claim 15, wherein the generating of the directional light field image comprises:
determining a type of the input image; and
generating the directional light field image according to the determined type of the input image.

17. The method of claim 16, wherein the generating of the directional light field image includes generating the directional light field image, by using the input image, a resolution of a light direction, and a frame rate of a 3D display device.

18. The method of claim 15, wherein the projecting of the directional light field image comprises:
reflecting, at the rotating mirror, an image output from the high speed projector; and
refracting, at the rotating lens, the image that is reflected at the rotating mirror.

19. The method of claim 18, wherein the projecting of the directional light field image further comprises:
reflecting, at a reflecting mirror, the image refracted at the rotating lens.

20. A non-transitory computer-readable recording medium storing a program configured to implement the method of claim 15.

21. A three-dimensional (3D) display apparatus, comprising:
an optical system including:
a projector configured to project light forming an image, in a predetermined direction;
a first mirror, with axial rotation about a central axis in line with the predetermined direction, configured to reflect the light forming an image;
a lens, with radial rotation about the central axis, configured to invert the reflected light forming an image; and
a second mirror, shaped around the first mirror and the lens, configured to reflect the inverted light forming an image onto the display unit;
an operation control unit configured to control an operation of the optical system, and a cylindrically shaped display unit configured to display the image projected onto the display unit, wherein the cylindrically shaped display unit includes a holographic screen;

wherein the light, forming the reflected and inverted image projected onto the display unit, embodies a horizontal parallax by having a vertical scattering angle larger than a horizontal scattering angle.

* * * * *